July 5, 1949.  A. J. GARDENHOUR  2,475,181
ELECTRIC INSECT DESTROYER

Filed Jan. 3, 1944  3 Sheets-Sheet 2

INVENTOR.
Allen J. Gardenhour.

BY
ATTORNEYS.

July 5, 1949.  A. J. GARDENHOUR  2,475,181
ELECTRIC INSECT DESTROYER

Filed Jan. 3, 1944  3 Sheets-Sheet 3

INVENTOR.
Allen J. Gardenhour.
BY Lancaster, Allwine and Rommel
ATTORNEYS.

Patented July 5, 1949

2,475,181

UNITED STATES PATENT OFFICE 2,475,181

ELECTRIC INSECT DESTROYER

Allen J. Gardenhour, Waynesboro, Pa.

Application January 3, 1944, Serial No. 516,800

2 Claims. (Cl. 43—112)

This invention relates to improvements in insect electrocutors.

The primary object of this invention is the provision of an electrical destroyer of flies, insects, etc., having an electrical grid the parts of which are durably and efficiently located so as to maintain a constant high tension voltage with a uniform air gap.

A further object of this invention is the provision of a relatively simple low cost electrical destroyer for the extermination of flies, insects, etc. wherein improved means is provided for mounting an electrical grid.

A further object of this invention is the provision of an improved insect electrocutor having an improved electrical grid formed of manually bendable but inherently stiff wires which are arranged so as to positively position the strand portions in accurate parallelism for the maintenance of a uniform air gap.

Other objects and advantages of this invention will be apparent during the course of the following detailed description.

In the accompanying drawings, forming a part of this specification, and wherein similar reference characters designate corresponding parts thruout the several views, Figure 1 is a plan view of the improved insect electrocutor.

Figure 3 is a cross sectional view taken thru the improved electrocutor transversely thereof, and in a plane normal to the plane in which Figure 2 is taken.

Figure 1:
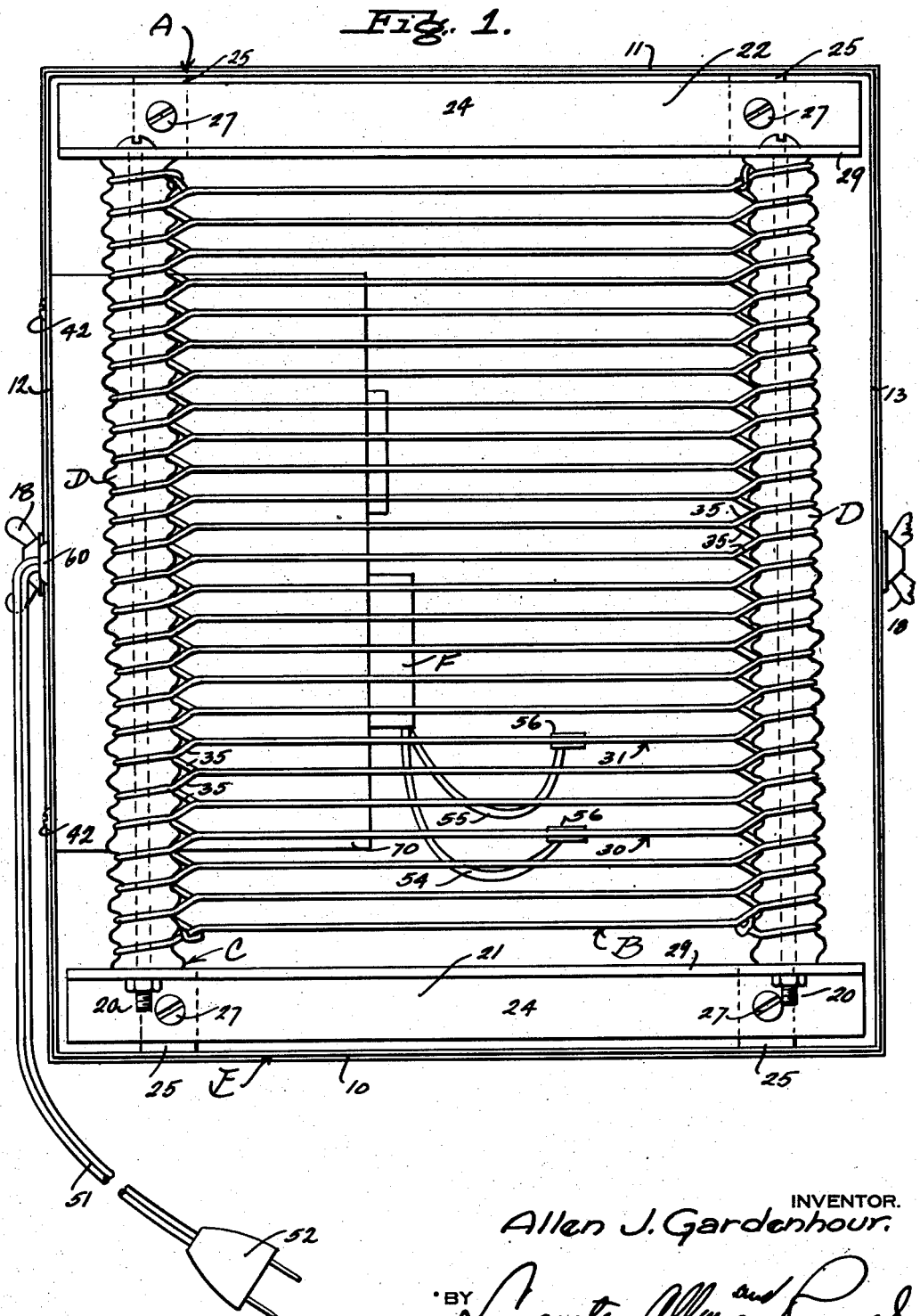

In the drawings, wherein for the purpose of illustration is shown only a preferred embodiment of the invention, the letter A may generally designate the improved electric destroyer of flies, insects and the like, which includes an electrical grid B having a supporting framework C which may include insulation bars or members D and a casing structure E. A transformer F is provided. In many types of insect electrocutors the electrocuting grid is of flimsy structure and lacks positiveness of position for efficient use and low cost maintenance. In the present invention these difficulties have been overcome by providing a relatively cheap type of grid formed of inherently stiff, yet manually bendable copper wires of a gauge which will enable the same to be crimped so that the strands thereof may be maintained in accurately spaced parallelism for the maintenance of a uniform air gap thruout the grid.

Figure 2:
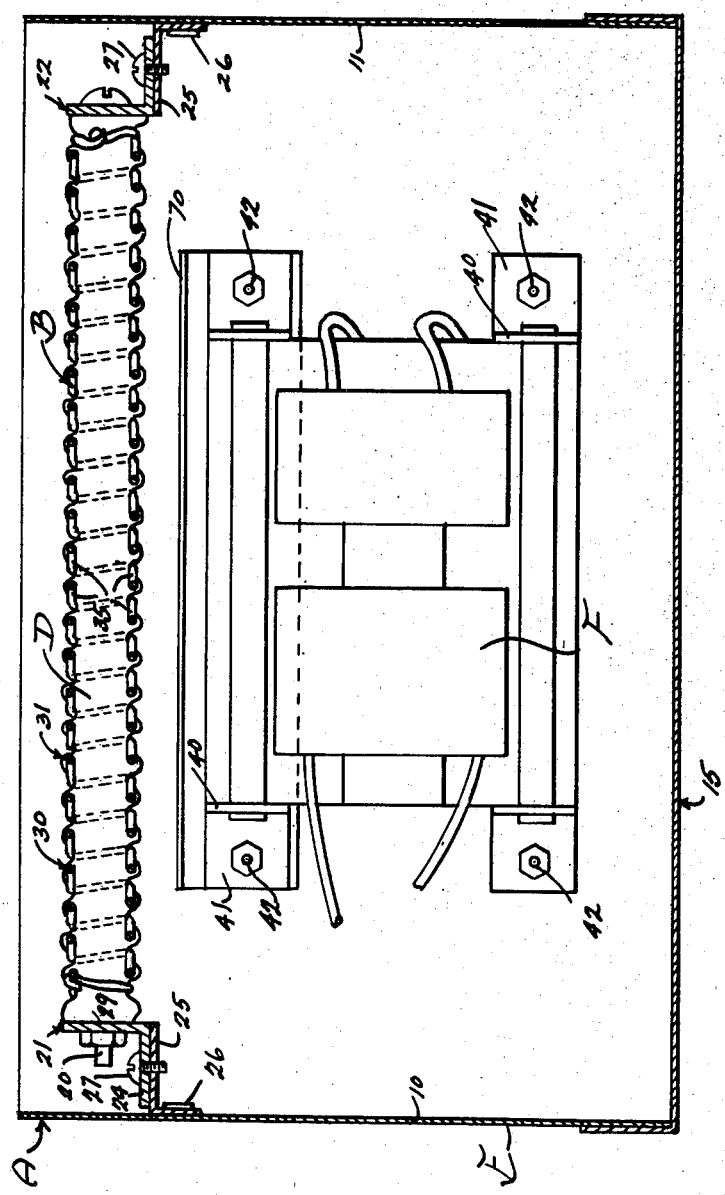
Figure 2 is a vertical cross sectional view taken thru the electrocutor in a plane normal to the strands of wire of the electrocuting grid.
Figure 3:
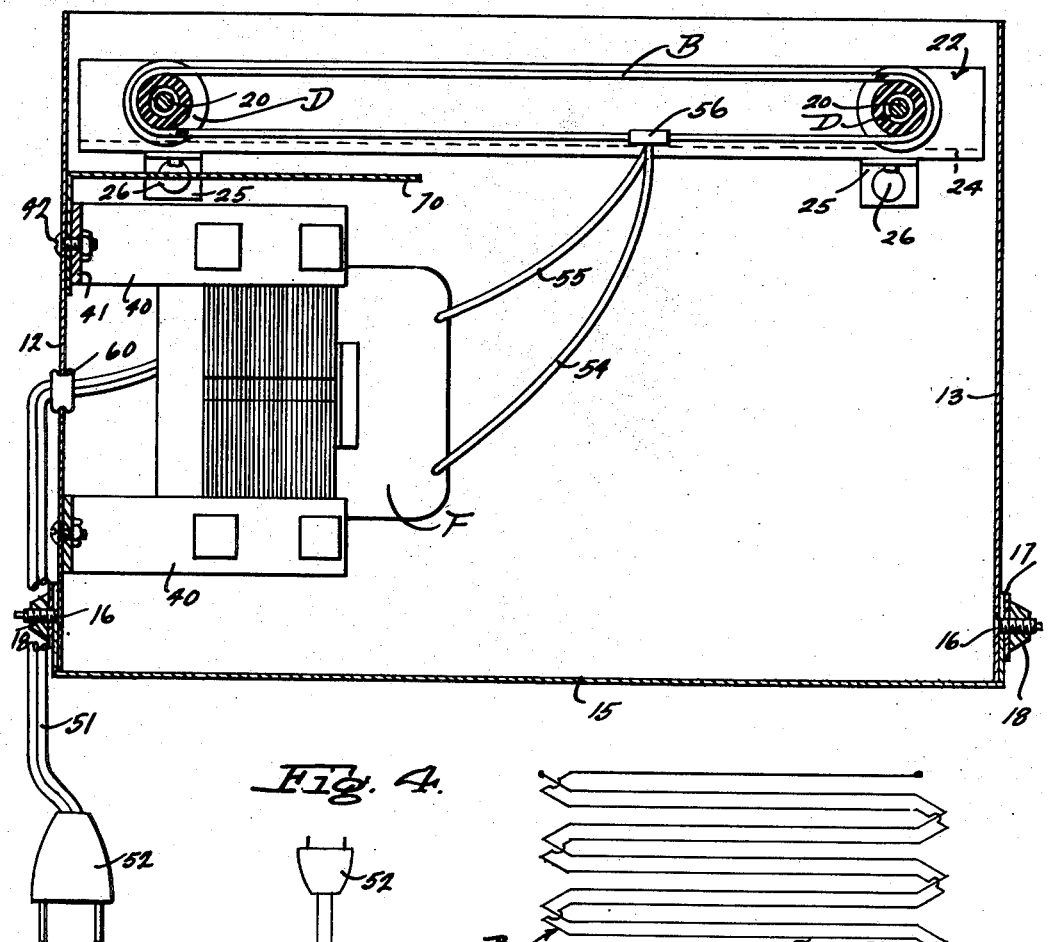

In the present instance the casing E is of sheet metal including end walls 10 and 11 and opposite side walls 12 and 13. The casing has an open top and is provided with a removable bottom tray 15 within which the lower margins of the end and side walls fit, as shown in Figures 2 and 3 of the drawings. The side walls 12 and 13 are provided with screw threaded studs 16 in the lower marginal portions thereof, either welded or otherwise secured thereto, and projecting beyond the outer surfaces for fitting in suitable slots 17 provided in the upwardly flanged walls of the tray 15, as shown in Figure 3. A suitable washer and wing nut structure 18 is provided for each of these screw threaded studs 16 to releasably clamp the tray in position upon the side and end walls, as is shown in the drawings. The tray may be readily removed by loosening the nuts.

The wire grid structure B is mounted upon the insulation bars or members D. These members D are hollow and each receives therein a mounting bolt 20 supported at its ends upon suitable reinforcing angle irons 21 and 22. The angle irons 21 and 22 are of metal and relatively heavy. They are appreciably stronger than the thinner gauge material of which the casing E is formed and therefore not only reinforce the casing structure but also provide means for the positive mounting and spacing of the grid bars D. They each include a horizontal leg portion 24 mounted upon suitable angle clips 25 which may be welded, as at 26, upon the inside surfaces of the end walls 10 and 11, as shown in the drawings. They may be supported by these angle clips in a detachable manner as by screws or bolts 27. The other leg portions 29 of the angle clips are in spaced relation with the adjacent walls of the casing on which they are mounted, in vertical position for supporting the bolts 20 and in turn the insulation bars or tubes D.

As shown in the drawings, two of the members D are provided, in spaced parallelism with the walls 12 and 13. The bolt structures 20 each include head and nut portions similar to that shown in Figure 1 of the drawings so that the bars D and grid structure may be readily detached from the angle irons.

Each of the insulation posts or members D is preferably made of porcelain or some cheaper insulating material and provided with an external spiral groove, extending from end to end, the pitch of which is relatively flat and of a uniform spacing equal to the air gap between adjacent strands of the grid. The thread formed by this spiral groove presents a convex apex and a concave root.

The grid structure B consists of two continuous wires 30 and 31 which are spirally wound in the grooves of the bars or members D so that the adjacent strands of wire in each electrocuting portion or the grid are of different wires. This effect is secured by winding each wire upon the bars or members D so that for each member D one wire is turned in alternate turns of the spiral groove; the intermediate or other turns of the groove receiving the turns of the other wire. These two wires are not in contact at any point and they are electrically charged as will be hereinafter described, with current of opposite polarity.

It will be noted from Figure 3 of the drawings that the supporting bars or members D are positioned in the same horizontal plane and within and close to the top of the casing E. In effect the grid structure provides an upper electrocuting grid and a lower electrocuting grid in which the strands of one grid are directly opposite the strands of the other grid, so as to insure the positive electrocution of insects falling between the strands of wire. In each of these grid portions the strands are absolutely parallel and uniformly spaced to insure an air gap which is just beyond the breakdown voltage.

Figure 4:
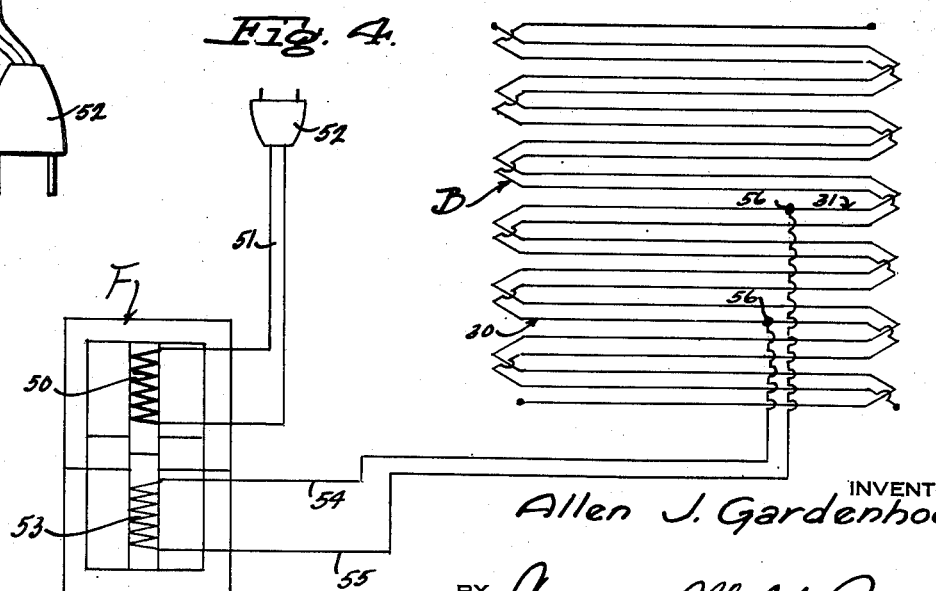
Figure 4 is a diagrammatic representation of the wiring circuit.

It was previously mentioned that the gauge of the wire forming the grid is such that while the wire is bendable, it is inherently stiff and will flex only under appreciable manual effort. So as to horizontally position and maintain true parallelism of the strands of wire, and to tension the same so that the strands lie exactly perpendicular to the axes of the bars or posts D, both the upper and lower grid portions of the wire grid arrangement are crimped immediately adjacent to the bars D, at 35; the crimps being straight and also in parallelism so as to maintain a uniform air gap. It is noted from the wiring diagram in Figure 4 that the two wires forming the grid are not in electrical contact at any point. The ends of these two wires at the ends of the supporting bars D may be wrapped completely around the said bars and soldered, each to itself. The wires 30 and 31 are crimped after being initially wound upon the bars D and this insures their tensioning and accurate gap spacing.

A laminated core gas tube transformer is used in the circuit and detachably supported upon the wall 12 of the casing structure E by means of four metal legs 40 having angled feet 41 abutting the inside surface of the wall 12 and secured thereto by detachable bolts 42. This transformer F, shown diagrammatically in Figure 4, includes a primary winding 50, the ends of which are connected to wires 51 having a connecting plug 52 of any approved nature. The secondary winding 53 has wires 54 and 55 leading therefrom respectively connected with any of the strand portions of the wires 30 and 31 respectively, as by soldering at 56.

In the improved electrocutor shown in the drawings, the adjacent strands of the wires forming the grid, in each of the upper and lower electrocuting grid portions of the grid arrangement, are positioned for a one quarter inch air gap. Under such circumstances the primary winding is 115 A. C. and the secondary is of 2,000 volts 18 milliamperes. The wider the air gap, the greater will be the secondary voltage required. The outlet wires 51 extend thru an insulation bushing 60 in the side wall 12 of the casing structure.

In order to shield the transformer F against dropping of electrocuted flies and insects thereon, I have provided a shield of thin gauge metal, designated at 70, having a flange portion detachably secured as by the bolt structures 42 above mentioned. While I have horizontally positioned the shield 70, the same may be slanted so as to insure the rolling of the insects into the bottom of the tray with facility.

The inside surfaces of the wall structure of the casing and the tray may have a marigold crinkled finish which is especially attractive to insects and flies.

It is apparent from the foregoing that adjacent strands of each upper and lower electrocuting grids of the grid structure will be supplied with current of opposite polarity. There is no possibility of leakage of the high tension voltage, because the air gap on all points in the grid is just beyond the breakdown voltage. Should a fly or insect pass thru the gap at any point in the grid, a circuit will arc thru the fly or insect, and the fly or insect will be electrocuted. It is to be understood that the principle of this invention may be adapted for electrocutors of larger sizes, such as for rodents, etc.

It is apparent from the foregoing that a relatively low cost electrocutor has been provided, which is sanitary and extemely positive in operation. The maintenance cost is very low and all parts are so durably constructed that under normal conditions of handling, the wires of the grid structure will not become deflected or damaged so as to destroy the uniform air gap. The flies are removed by loosening the wing nuts and removing the tray from the casing.

Various changes in the shape, size and arrangement of parts may be made to the form of invention herein shown and described without departing from the spirit of the invention or the scope of the claims.

I claim:

1. In an electrocutor for electrocuting insects and the like, the combination of a framework, a plurality of bars of insulation material having spiral grooves extending therealong and each groove comprising a plurality of convolutions, means mounting the bars in spaced relation upon said framework, and electrically conductive wire wound in the grooves of the bars and providing narrow strand portions extending between the bars in spaced air gap providing relation, the strands of wire adjacent each of the bars being crimped, the crimps at opposite bars extending at opposite sides of the axis of the strand between said crimps.

2. In an insect electrocutor the combination of a framework, relatively spaced elongated insulation bars connected in substantially parallel spaced relation to said framework, said bars being provided with continuous spiral grooves therealong, and electrically conductive wire wound between said bars and disposed around said bars in the spiral grooves to provide spaced grid portions extending between said bars, each of said grid portions including a plurality of strands of wire extending between the spaced bars, said strands being crimped at the ends thereof so as to dispose the strand of one grid directly opposite the strand of the other grid.

ALLEN J. GARDENHOUR.

(References on following page)

REFERENCES CITED

The following references are of record in the file of this patent:

UNITED STATES PATENTS

| Number | Name | Date |
|---|---|---|
| 1,159,157 | Bass | Nov. 2, 1915 |
| 1,429,691 | Pandolfo | Sept. 19, 1922 |
| 1,910,623 | McWilliams et al. | May 23, 1933 |
| 1,972,180 | Bowman | Sept. 4, 1934 |
| 2,001,414 | Folmer et al. | May 14, 1935 |
| 2,030,310 | McWilliams | Feb. 11, 1936 |
| 2,219,743 | Karr | Oct. 29, 1940 |
| 2,302,803 | Root | Nov. 24, 1942 |

FOREIGN PATENTS

| Number | Country | Date |
|---|---|---|
| 537,566 | France | Mar. 6, 1922 |